United States Patent
G et al.

(10) Patent No.: US 11,036,475 B2
(45) Date of Patent: Jun. 15, 2021

(54) SYSTEM AND METHOD FOR GENERATION OF MODEL DESCRIPTOR OF A PLURALITY OF SPECIFICATIONS

(71) Applicant: Tata Consultancy Services Limited, Mumbai (IN)

(72) Inventors: Ratna Raj G, Hyderabad (IN); Neeraj Joshi, Hyderabad (IN); Ramesh Kumar Sattaru, Hyderabad (IN); Mahesh Mateti, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 287 days.

(21) Appl. No.: 16/161,669

(22) Filed: Oct. 16, 2018

(65) Prior Publication Data
US 2019/0116098 A1 Apr. 18, 2019

(30) Foreign Application Priority Data
Oct. 16, 2017 (IN) .............................. 201721036744

(51) Int. Cl.
*G06F 8/34* (2018.01)
*G06F 9/50* (2006.01)
(Continued)

(52) U.S. Cl.
CPC .................. *G06F 8/34* (2013.01); *G06F 8/35* (2013.01); *G06F 9/455* (2013.01); *G06F 9/5005* (2013.01);
(Continued)

(58) Field of Classification Search
None
See application file for complete search history.

(56) References Cited

U.S. PATENT DOCUMENTS

| 7,707,569 | B2 * | 4/2010 | Kraemer | G06F 8/10 717/159 |
| 8,495,580 | B2 * | 7/2013 | Gowri | G06F 11/3608 717/126 |

(Continued)

FOREIGN PATENT DOCUMENTS

EP 3070550 9/2016

OTHER PUBLICATIONS

Czarnecki et al., "Feature-based survey of model transformation approaches," IEEE, 2006, 25pg. (Year: 2006).*
(Continued)

*Primary Examiner* — Ryan D. Coyer
(74) *Attorney, Agent, or Firm* — Finnegan, Henderson, Farabow, Garrett & Dunner, LLP (57) ABSTRACT

In traditional systems and methods, to provide infrastructure, a plurality of data models needs to be created individually for each of the respective cloud or container technologies. The creation of data models is complex, time consuming, and has tight coupling with the Infra provider, resulting in vendor lock-in. Embodiments of the present disclosure, implements method of generating a model descriptor corresponding to plurality of specifications by (a) receiving, at a reverse transformation layer, a specific model descriptor as an input for a required target platform; (b) generating, by a common model descriptor generator, a common model descriptor based on a reverse transformation, wherein the reverse transformation comprising step of detecting supported platform by scanning the inputted specific model descriptor and invokes a specific reverse transformer; and (c) transforming, by a forward transformation layer, the common model descriptor to multiple model descriptors by invoking a plurality of transformers

18 Claims, 6 Drawing Sheets

(51) Int. Cl.
*G06F 9/455* (2018.01)
*H04L 29/08* (2006.01)
*G06F 8/35* (2018.01)

(52) U.S. Cl.
CPC .......... *G06F 9/5066* (2013.01); *G06F 9/5077* (2013.01); *H04L 67/34* (2013.01)

(56) References Cited

U.S. PATENT DOCUMENTS

| | | | |
|---|---|---|---|
| 8,566,358 B2 | 10/2013 | Lane et al. | |
| 2006/0130011 A1* | 6/2006 | Cornell | G06F 8/10 717/136 |
| 2008/0046864 A1* | 2/2008 | Bai | G06F 8/74 717/105 |
| 2008/0229276 A1* | 9/2008 | Koehler | G06F 8/35 717/104 |
| 2009/0150854 A1* | 6/2009 | Elaasar | G06F 8/35 717/104 |
| 2011/0252420 A1 | 10/2011 | Tung et al. | |
| 2013/0054205 A1* | 2/2013 | Yagi | G06F 30/3323 703/2 |
| 2015/0051890 A1* | 2/2015 | Saha | G06F 30/00 703/6 |
| 2018/0341477 A1* | 11/2018 | Kulkarni | G06F 8/76 |

OTHER PUBLICATIONS

Favre, Jean-Marie, "Foundations of Model (Driven) (Reverse) Engineering: Models," dagstuhl.de, 2005, 31 pg. (Year: 2005).*

Lano et al., "Model-Transformation Design Patterns," IEEE, 2014, 36pg. (Year: 2014).*

Kolovos et al., "Model Comparison: A Foundation for Model Composition and Model Transformation Testing," ACM, 2006, 8pg. (Year: 2006).*

Volter, Markus, "Model-Driven Software Development: Selected Topics," voelter.de, 2006, 39pg. (Year: 2006).*

\* cited by examiner

SYSTEM AND METHOD FOR GENERATION OF MODEL DESCRIPTOR OF A PLURALITY OF SPECIFICATIONS

PRIORITY CLAIM

This U.S. patent application claims priority under 35 U.S.C. § 119 to: India Application No. 201721036744, filed on Oct. 16, 2017. The entire contents of the aforementioned application are incorporated herein by reference.

TECHNICAL FIELD

This disclosure relates generally to information and technology, and, more particularly, to a system and method for generation of a model descriptor of a plurality of specifications.

BACKGROUND

Recently, Information and technology infrastructure and network devices are rapidly adopting cloud infrastructure and network function virtualization and container technologies. This helps in providing service agility, driving innovation and optimizing OPEX (operation expense). When deploying virtualized applications to a given cloud or container infrastructure, it is often required that certain customized configurations be performed, depending on the infrastructure provider. Therefore, these technologies involve design and implementation of multiple data and service models depending on the various technologies chose by Infrastructure providers.

Therefore, to provide infrastructure, a plurality of data models for each of the respective cloud or container technologies are to be created. The creation of data models is complex and time consuming. The other issue with creating specific data models is their tight coupling with the Infra provider, resulting in vendor lock-in.

SUMMARY

Embodiments of the present disclosure present technological improvements as solutions to one or more of the above-mentioned technical problems recognized by the inventors in conventional systems. For example, in one aspect, there is provided a processor implemented system for generating a model descriptor corresponding to a plurality of specifications. The system comprises: a memory storing instructions; one or more communication interfaces; and one or more hardware processors coupled to the memory via the one or more communication interfaces, wherein the one or more hardware processors are configured by the instructions to: (a) receive, at a reverse transformation layer, a specific model descriptor as an input for a required target platform; (b) generate, by a common model descriptor generator, a common model descriptor based on a reverse transformation, wherein the reverse transformation comprising step of detecting supported platform by scanning the inputted specific model descriptor and invokes a specific reverse transformer; and (c) transform, by a forward transformation layer, the common model descriptor to multiple model descriptors by invoking a plurality of transformers.

In an embodiment, the one or more hardware processors may be further configured to: (a) identify, by a reverse transformer, a plurality of resources in the input model descriptor; and (b) generate, an equivalent definition of the plurality of resources according to specification associated with the common model descriptor. In an embodiment, a platform specific model descriptor may be configured to monitor a platform specific specification and transforms into the common model descriptor by invoking the reverse transformers of a specific platform. In an embodiment, the one or more hardware processors may be further configured to: identify a supported platform of the platform specific model descriptor by matching with a plurality of specifications of an at least one known platform and invokes the platform specific reverse transformer.

In an embodiment, the one or more hardware processors may be further configured to: (a) parse, by the platform specific reverse transformer, parses the platform specific model descriptor; and (b) identify the plurality of resources and associated relationships described in the platform specific model descriptor using a plurality of platform specific policies. The common model descriptor may be a model descriptor which complies with a platform independent common specification. The visual model may be displayed on the visual modeler to show a graphical representation of the model descriptor and to update a plurality of operations on the visual model. The visual modeler may be a composer graphical user interface to compose and configure a plurality of resources graphically to generate a visual model. The common model descriptor generator may be configured to generate the common model descriptor based on the generated visual model. In an embodiment, the one or more hardware processors may be further configured to: dynamically generate, by the common model descriptor generator, updated version of the common model descriptor for the visual model.

In another aspect, a processor implemented method of generating a model descriptor corresponding to a plurality of specifications is provided. The method comprises (a) receiving, at a reverse transformation layer, a specific model descriptor as an input for a required target platform; (b) generating, by a common model descriptor generator, a common model descriptor based on a reverse transformation, wherein the reverse transformation comprising step of detecting supported platform by scanning the inputted specific model descriptor and invokes a specific reverse transformer; and (c) transforming, by a forward transformation layer, the common model descriptor to multiple model descriptors by invoking a plurality of transformers.

In an embodiment, the method may further comprise: (a) identifying, by a reverse transformer, a plurality of resources in the input model descriptor; and (b) generating, an equivalent definition of the plurality of resources according to specification associated with the common model descriptor. In an embodiment, a platform specific model descriptor may be configured to monitor a platform specific specification and transforms into the common model descriptor by invoking the reverse transformers of a specific platform. In an embodiment, the method may further comprise the step of identifying a supported platform of the platform specific model descriptor by matching with a plurality of specifications of an at least one known platform and invokes the platform specific reverse transformer.

The method may further comprise: (a) parsing, by the platform specific reverse transformer, parses the platform specific model descriptor; and (b) identifying, the plurality of resources and associated relationships described in the platform specific model descriptor using a plurality of platform specific policies. The common model descriptor may be a model descriptor which complies with a platform independent common specification. The visual model may be displayed on the visual modeler to show a graphical representation of the model descriptor and to update a plurality of operations on the visual model. The visual modeler may be a composer graphical user interface to compose and configure a plurality of resources graphically to generate a visual model. The common model descriptor generator may be configured to generate the common model descriptor based on the generated visual model. In an embodiment, the method may further comprise the step of dynamically generating, by the common model descriptor generator, updated version of the common model descriptor for the visual model.

In yet another aspect, there are provided one or more non-transitory machine readable information storage mediums comprising one or more instructions which when executed by one or more hardware processors causes receiving, at a reverse transformation layer, a specific model descriptor as an input for a required target platform; (b) generating, by a common model descriptor generator, a common model descriptor based on a reverse transformation, wherein the reverse transformation comprising step of detecting supported platform by scanning the inputted specific model descriptor and invokes a specific reverse transformer; and (c) transforming, by a forward transformation layer, the common model descriptor to multiple model descriptors by invoking a plurality of transformers.

In an embodiment, the instructions when executed by the one or more hardware processors may further cause (a) identifying, by a reverse transformer, a plurality of resources in the input model descriptor; and (b) generating, an equivalent definition of the plurality of resources according to specification associated with the common model descriptor. In an embodiment, a platform specific model descriptor may be configured to monitor a platform specific specification and transforms into the common model descriptor by invoking the reverse transformers of a specific platform. In an embodiment, the instructions when executed by the one or more hardware processors may further cause identifying a supported platform of the platform specific model descriptor by matching with a plurality of specifications of an at least one known platform and invokes the platform specific reverse transformer. In an embodiment, the instructions when executed by the one or more hardware processors may further cause (a) parsing, by the platform specific reverse transformer, parses the platform specific model descriptor; and (b) identifying the plurality of resources and associated relationships described in the platform specific model descriptor using a plurality of platform specific policies.

The common model descriptor may be a model descriptor which complies with a platform independent common specification. The visual model may be displayed on the visual modeler to show a graphical representation of the model descriptor and to update a plurality of operations on the visual model. The visual modeler may be a composer graphical user interface to compose and configure a plurality of resources graphically to generate a visual model. The common model descriptor generator may be configured to generate the common model descriptor based on the generated visual model. In an embodiment, the instructions when executed by the one or more hardware processors may further cause dynamically generated, by the common model descriptor generator, updated version of the common model descriptor for the visual model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present invention discloses a method and system for creating a common framework for any cloud and a container system. The framework assists in generating a model in common specification and further auto translates to one or more target providers specifications. The proposed framework can extend to any new providers specifications.

Referring now to the drawings, and more particularly to FIGS. 1 through FIG. 6, where similar reference characters denote corresponding features consistently throughout the figures, there are shown preferred embodiments and these embodiments are described in the context of the following exemplary system and/or method.

Figure 1:
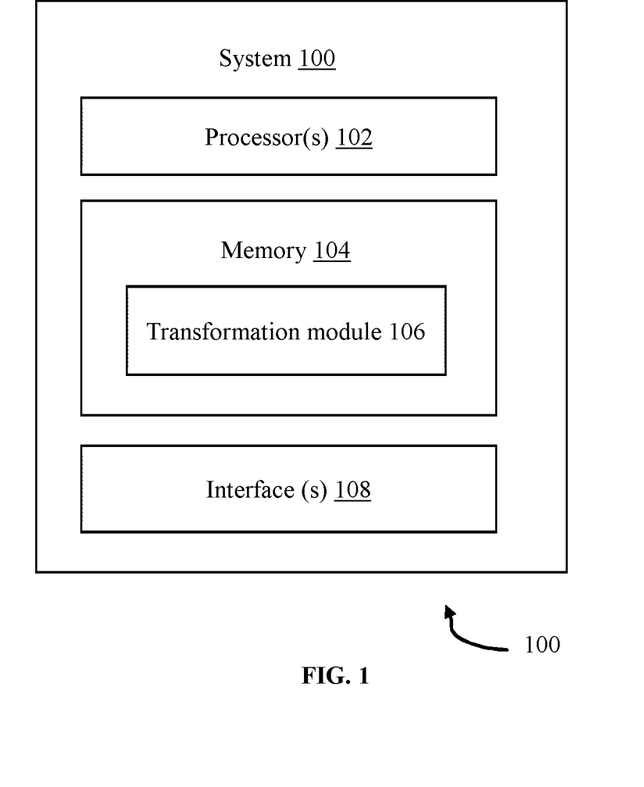
FIG. 1 illustrates a system to generate a model descriptor corresponding to a plurality of specifications, in accordance with an embodiment of the present disclosure.

FIG. 1 illustrates a system 100 to generate a model descriptor corresponding to a plurality of specifications, in accordance with an embodiment of the present disclosure. In an embodiment, the system 100 includes one or more processors 102, communication interface device(s) or input/output (I/O) interface(s) 108, and one or more data storage devices or memory 104 operatively coupled to the one or more processors 102. The memory 104 comprises a database 108. Further, the memory 104 includes a transformation module 106. The one or more processors 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 108 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database may store information but are not limited to, a plurality of parameters obtained from one or more sensors, wherein the parameters are specific to an entity (e.g., user, machine, and the like). Parameters may comprise sensor data captured through the sensors either connected to the user and/or machine. Further, the database stores information pertaining to inputs fed to the system 100 and/or outputs generated by the system (e.g., at each stage), specific to the methodology described herein. More specifically, the database stores information being processed at each step of the proposed methodology.

In an embodiment, the memory 104 includes the transformation module 106 and/or other modules. The transformation module 106 includes routines, programs, objects, components, resources, data structures, etc., which perform particular tasks or implement particular abstract data types. The other modules may include programs or coded instructions that supplement applications and functions of the system 100. In an embodiment, the transformation module 106 creates a common framework that can be utilized to generate a common model with common specification. The common specification can be further translated to customize into one or more required specification.

Figure 2:
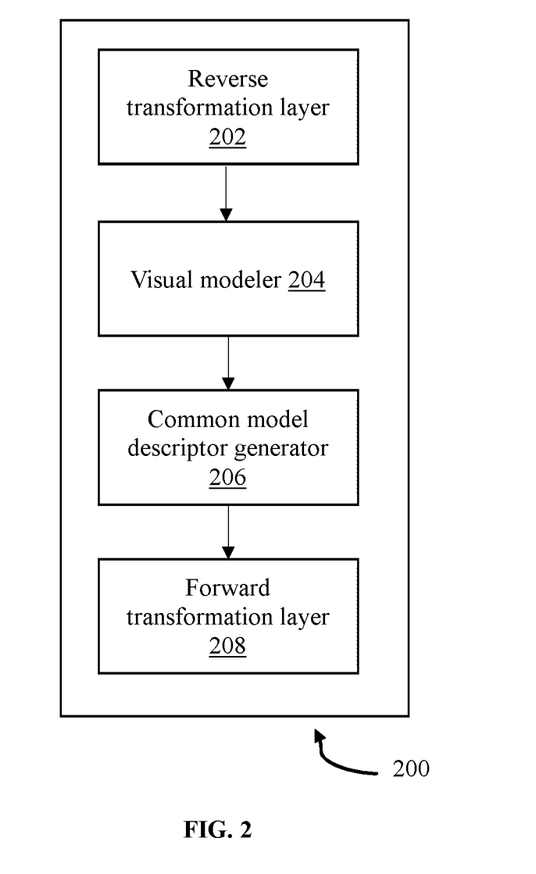
FIG. 2 is an exemplary system to generate the model descriptor corresponding to the plurality of specifications, in accordance with an embodiment of the present disclosure.

FIG. 2 illustrates an exemplary system 200 to generate the model descriptor corresponding to the plurality of specifications, in accordance with an embodiment of the present disclosure. The system 200 includes a reverse transformation layer 202, a visual modeler 204, a common model descriptor generator 206, and a forward transformation layer 208. The reverse transformation layer 202 is configured to receive a specific model descriptor as an input for a required target platform. In an embodiment, the model descriptor describes a plurality of components and corresponding composition, required to host and execute an application. In an embodiment, the plurality of components corresponds to plurality of resources. In an exemplary embodiment, the plurality of resources includes Compute, Storage, Network, Container etc. virtual components. In embodiment, the composition is relating the plurality of resources with some relationship (e.g., connect, attach). Further, the compute is connected to the network and similarly the storage is attached to the compute.

The common model descriptor generator (206) is configured to generate a common model descriptor (402) based on a reverse transformation. The reverse transformation includes the step of detecting supported platform by scanning the inputted specific model descriptor and invokes a specific reverse transformer. The forward transformation layer (208) is configured to transform the common model descriptor (402) to multiple model descriptors by invoking a plurality of transformers.

Figure 3:
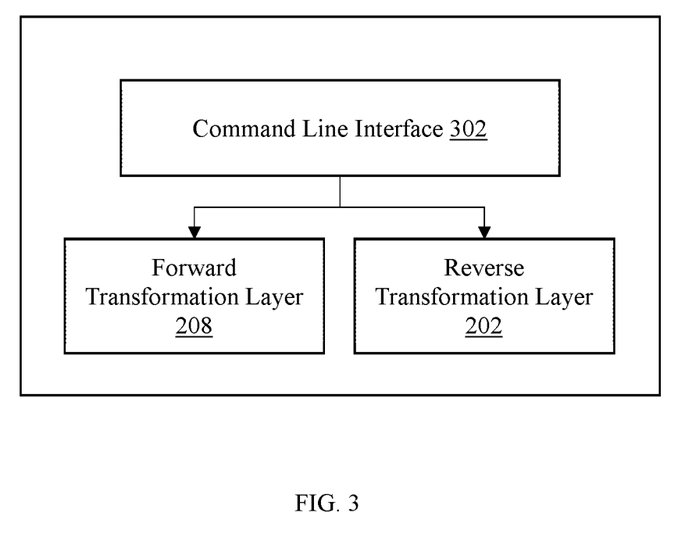
FIG. 3 illustrates an architecture for a command line interface with reference to FIG. 2, in accordance with an embodiment of the present disclosure.

With reference to FIG. 2, FIG. 3 illustrates an architecture for the command line interface 302, in accordance with an embodiment of the present disclosure. In an embodiment, the command line interface 302 connects to (a) a forward transformation layer 208 and (b) a reverse transformation layer 202. In an embodiment, one or more specific commands run in the command line interface 302 to translate a platform specific model descriptor into a common model descriptor and vice versa e.g., from one specification to another specification. In an embodiment, the command line interface 302 acts as programmatic interface to integrate the system with any other systems for automation.

Figure 4:
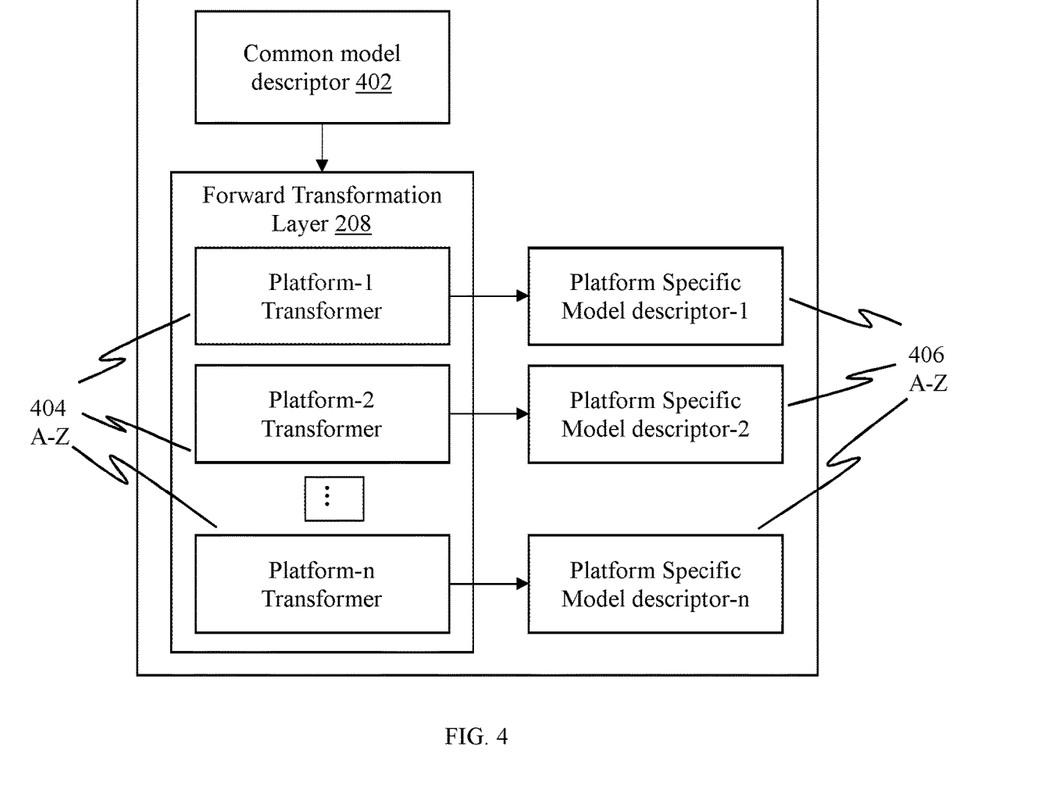
FIG. 4 illustrates an architecture of forward transformation with reference to FIG. 2, in accordance with an embodiment of the present disclosure.

With reference to FIG. 2, FIG. 4 illustrates an architecture of the forward transformation, in accordance with an embodiment of the present disclosure. The forward transformation layer 208 includes one or more platform transformers 404A-Z such as a platform transformer 1 to platform transformer n. In an embodiment, to perform forward transformation, the transformation module 106 takes the common model descriptor 402 that is complying with a platform independent specification as an input and invokes one or more platform transformers 404A-Z from the forward transformation layer 208. Subsequently, each of the one or more platform transformers 404A-Z takes the common model descriptor 402 as an input and performs forward transformation to obtain one or more platform specific model descriptors 406 as an output that complies with respective one or more platform specific specifications. In an embodiment, the system may be extendable to support new platforms in real time by adding one or more transformers.

Figure 5:
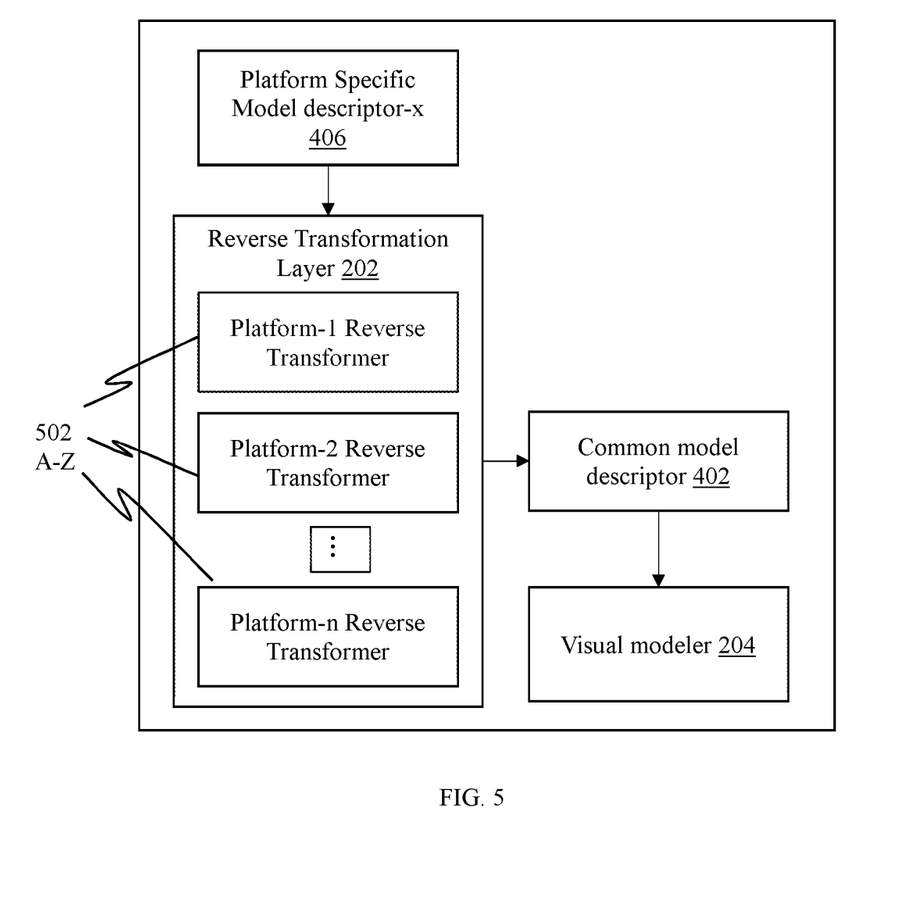
FIG. 5 illustrates an architecture of reverse transformation with reference to FIG. 2, in accordance with an embodiment of the present disclosure.

With reference to FIG. 2, FIG. 5 illustrates an architecture of the reverse transformation, in accordance with an embodiment of the present disclosure. In an embodiment, the reverse transformation layer 202 is utilized to perform a reverse transformation on one or more platform specific model descriptor 406. The reverse transformation layer 202 comprises of one or more reverse transformers corresponding to a plurality of platforms. In an embodiment, the one or more reverse platform transformers 502A-Z performs a reverse transformation to generate the common model descriptor 402. In reverse transformation, the reverse transformation layer 202 takes a platform specific model descriptor 406 that is complying with platform specific specification of any platform as input and performs reverse transformation using respective reverse platform transformer 502 of platform 1 reverse transformer to platform n reverse transformer.

In an embodiment, the reverse transformation layer 202 invokes only that specific transformer corresponding to its platform and generate common model descriptor. The common model descriptor 402 is further imported into visual modeler 204 to display graphical representation of the model offered in model descriptor. In an embodiment, the visual model is displayed on the visual modeler (204) to show a graphical representation of the model descriptor and to update plurality of operations on the visual model. For example, the plurality of operations is adding/modifying/removing the components (including their relationships) and properties of components. The visual modeler is a composer graphical user interface to compose and configure resources graphically to generate new models which then is used to generate common model descriptor by the common model descriptor generator.

For example:

Assume the new requirement is to add storage to the existing compute resource from the visual modeler.

Once the changes are made and the model is saved in the visual modeler (204), the common model descriptor generator (206) generates the common model descriptor according to the visual model.

In an embodiment, a reverse transformer identifies plurality of resources in the input model descriptor and generates an equivalent definition of the plurality of resources according to specification associated with the common model descriptor (402).

For example:

Assuming an application has a model descriptor for a simple model. When the model need to be changed according to new or changed requirements of the application, one can import the model descriptor in to the system. As part of import process, reverse transformation take place where the system identifies the supported platform of the model descriptor by matching with the specifications of known platforms and then it invokes the platform specific reverse transformer. In an embodiment, the reverse transformation further includes at least one step of: (a) parsing, by the platform specific reverse transformer, parses the platform specific model descriptor (406), and (b) identifying the plurality of resources and associated relationships described in the platform specific model descriptor (406) using a plurality of platform specific policies.

Further, the reverse transformer then maps the resources and relationships definitions to the plurality of platform specific policies of the common model descriptor to identify the target format of the same and generates the common model descriptor (402). In an embodiment, as part of identifying the target format, it also identifies the mandatory or dependent entities that are required in the common model descriptor according to the common model descriptor specifications with the help of policies. In an exemplary embodiment, the policies are defined as follows:

Policies:

Specification Policy:

Specification Policy defines resources and associated relationships according to the model descriptor specification of the platform. For example, all possible resources and their configuration parameter are defined in YAML format. All possible relationships between the resources are also defined along with the relationship properties as applicable.

Mapping Policy:

Mapping Policy is created for each transformer which defines the mapping between definitions of a source specification and a target specification. For example, mapping results in one-to-one resource mapping or one-to-many resource mapping or many-to-one resource mapping.

(a) One-to-one resource mapping:

Resource A in the source specification is defined as resources X in target specification.

(b) One-to-many resource mapping:

Resource A in source specification is defined as resources X and Y in target specification.

(c) Many-to-one resource mapping:

Resources A and B in source specification are defined as resources X in target specification.

In an embodiment, during transformation of a model descriptor from the source specification to the target specification, the system uses the respective mapping policy to generate the target model.

Figure 6:
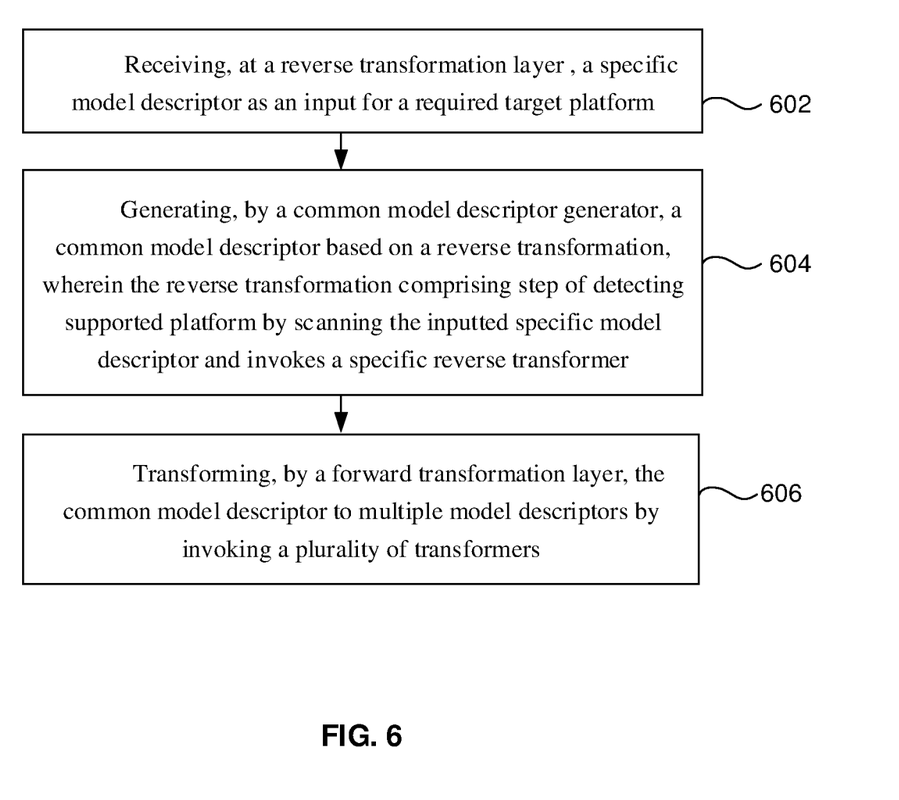
FIG. 6 is an exemplary flow diagram illustrating a method for generating a model descriptor corresponding to a plurality of specifications in accordance with an embodiment of the present disclosure.

FIG. 6 is an exemplary flow diagram illustrating a method for generating a model descriptor corresponding to a plurality of specifications in accordance with an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description.

The steps of the method of the present disclosure will now be explained with reference to the components of the system 100 as depicted in FIG. 2. In an embodiment of the present disclosure, at step 602, the one or more hardware processors 102, receives, at a reverse transformation layer (202), a specific model descriptor as an input for a required target platform. In an embodiment of the present disclosure, at step 604, the one or more hardware processors 102, generates, by a common model descriptor generator (206), a common model descriptor (402) based on a reverse transformation. In an embodiment, the reverse transformation comprising step of detecting supported platform by scanning the inputted specific model descriptor and invokes a specific reverse transformer. In an embodiment of the present disclosure, at step 606, the one or more hardware processors 102, transforms, by a forward transformation layer (208), the common model descriptor (402) to multiple model descriptors by invoking a plurality of transformers.

In an embodiment, further comprises, a supported platform of the platform specific model descriptor (406) is identified by matching with a plurality of specifications of an at least one known platform and invokes the platform specific reverse transformer. In an embodiment, the common model descriptor (402) is a model descriptor which complies with a platform independent common specification.

This embodiments of present disclosure herein addresses unresolved problem of creating data models for each of adopted cloud technology. The embodiments of the present disclosure, thus facilitates, to generate model in common specifications and auto-translates to one or more target infra provider specifications, as needed. The system discovers and generates a target model from any existing system of any type of providers using specification-independent model. The embodiments of the present disclosure, provides Pluggable framework to extend for any new provider's specifications.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof.

The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system to generate a model descriptor corresponding to a plurality of specifications, wherein the system comprising:
    a memory (104) storing instructions;
    one or more communication interfaces (108); and
    one or more hardware processors (102) coupled to the memory (104) via the one or more communication interfaces (108), wherein the one or more hardware processors (102) are configured by the instructions to:
      (a) receive, at a reverse transformation layer (202), a specific model descriptor as an input for a required target platform, wherein the model descriptor is graphically represented as a visual model in a visual modeler (204);
      (b) generate, using a common model descriptor generator (206), a common model descriptor (402) based on the visual model, by applying a reverse transformation, wherein the reverse transformation comprising a step of detecting a supported platform by scanning the specific model descriptor and invokes a specific reverse transformer from a plurality of reverse transformers corresponding to a plurality of platforms; and
      (c) transform, using a forward transformation layer (208), the common model descriptor (402) to multiple model descriptors by invoking a plurality of transformers.

2. The system of claim 1, wherein the one or more hardware processors are further configured to:
    (a) identify, using a reverse transformer, a plurality of resources in the input model descriptor; and
    (b) generate, an equivalent definition of the plurality of resources according to specification associated with the common model descriptor (402).

3. The system of claim 1, wherein a platform specific model descriptor (406) is configured to monitor a platform specific specification and transforms into the common model descriptor (402) by invoking the reverse transformers of a specific platform.

4. The system of claim 1, wherein the one or more hardware processors are further configured to: identify a supported platform of the platform specific model descriptor (406) by matching with a plurality of specifications of an at least one known platform and invokes the platform specific reverse transformer.

5. The system of claim 4, wherein the one or more hardware processors are further configured to:
    (a) parse, using the platform specific reverse transformer, the platform specific model descriptor (406); and
    (b) identify the plurality of resources and associated relationships described in the platform specific model descriptor (406) using a plurality of platform specific policies.

6. The system of claim 1, wherein the common model descriptor (402) is a model descriptor which complies with a platform independent common specification.

7. The system of claim 1, wherein the visual modeler (204) dynamically updates a plurality of operations in the visual model.

8. The system of claim 2, wherein the visual modeler (204) is a composer graphical user interface to compose and configure the plurality of resources graphically to generate the visual model.

9. The system of claim 7, wherein the one or more hardware processors are further configured to: dynamically generate, using the common model descriptor generator (206), an updated version of the common model descriptor (402) for the visual model.

10. A processor implemented method for generating a model descriptor corresponding to a plurality of specifications, comprising:
- (a) receiving, at a reverse transformation layer (202), a specific model descriptor as an input for a required target platform, wherein the model descriptor is graphically represented as a visual model in a visual modeler (204);
- (b) generating, by a common model descriptor generator (206), a common model descriptor (402) based on the visual model, by applying a reverse transformation, wherein the reverse transformation comprising a step of detecting a supported platform by scanning the specific model descriptor and invokes a specific reverse transformer from a plurality of reverse transformers corresponding to a plurality of platforms; and
- (c) transforming, by a forward transformation layer (208), the common model descriptor (402) to multiple model descriptors by invoking a plurality of transformers.

11. The processor implemented method of claim 10, further comprising:
- (a) identifying, by a reverse transformer, a plurality of resources in the input model descriptor; and
- (b) generating, an equivalent definition of the plurality of resources according to specification associated with the common model descriptor (402).

12. The processor implemented method of claim 10, wherein a platform specific model descriptor (406) monitors a platform specific specification and transforms into the common model descriptor (402) by invoking the reverse transformers of a specific platform.

13. The processor implemented method of claim 11, further comprising, identifying a supported platform of the platform specific model descriptor (406) by matching with a plurality of specifications of an at least one known platform and invokes the platform specific reverse transformer.

14. The processor implemented method of claim 13, further comprising:
- (a) parsing, by the platform specific reverse transformer, the platform specific model descriptor (406); and
- (b) identifying the plurality of resources and associated relationships described in the platform specific model descriptor (406) using a plurality of platform specific policies.

15. The processor implemented method of claim 10, wherein the common model descriptor (402) is a model descriptor which complies with a platform independent common specification.

16. The processor implemented method of claim 10, wherein the visual modeler (204) dynamically updates a plurality of operations in the visual model.

17. The processor implemented method of claim 11, wherein the visual modeler (204) is a composer graphical user interface to compose and configure the plurality of resources graphically to generate the visual model.

18. The processor implemented method of claim 16, further comprising dynamically generating, by the common model descriptor generator (206), an updated version of the common model descriptor (402) for the visual model.

* * * * *